April 23, 1968      A. E. VANO      3,378,892
QUICK-ATTACH MECHANISM
Filed July 25, 1966      2 Sheets-Sheet 1
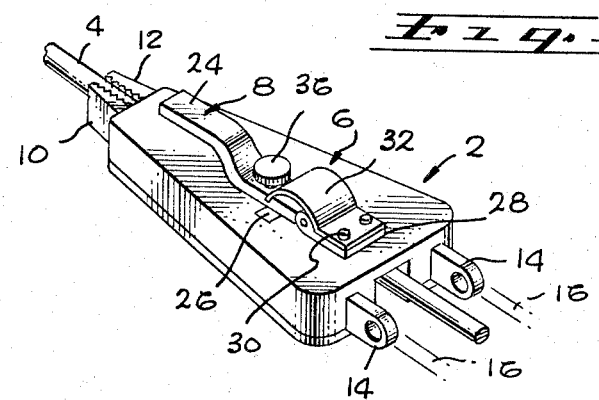
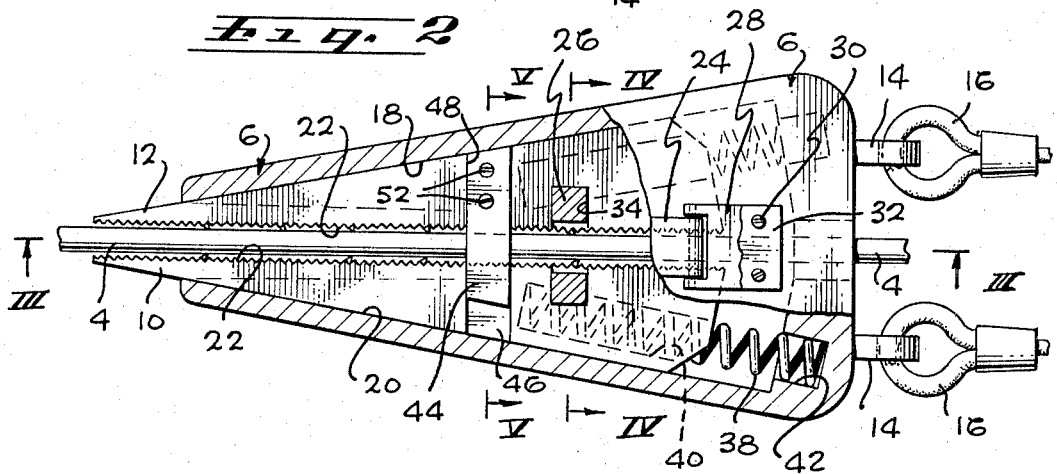
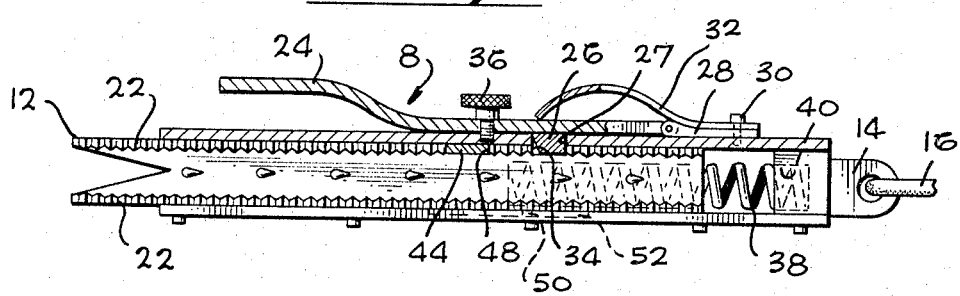
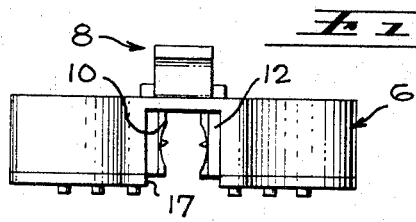
INVENTOR.
ANDREW E. VANO
BY G. F. McCoy
Howard B. Scheckman
ATTORNEYS

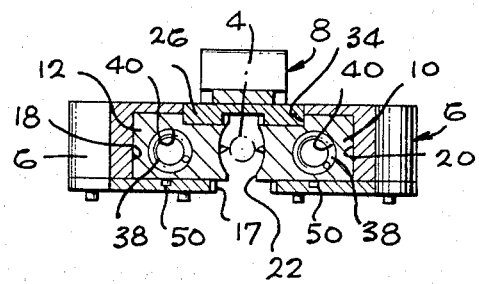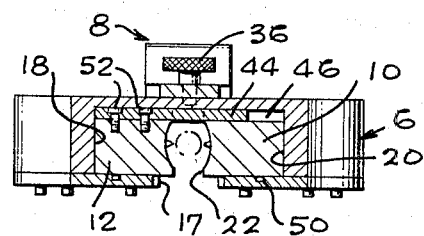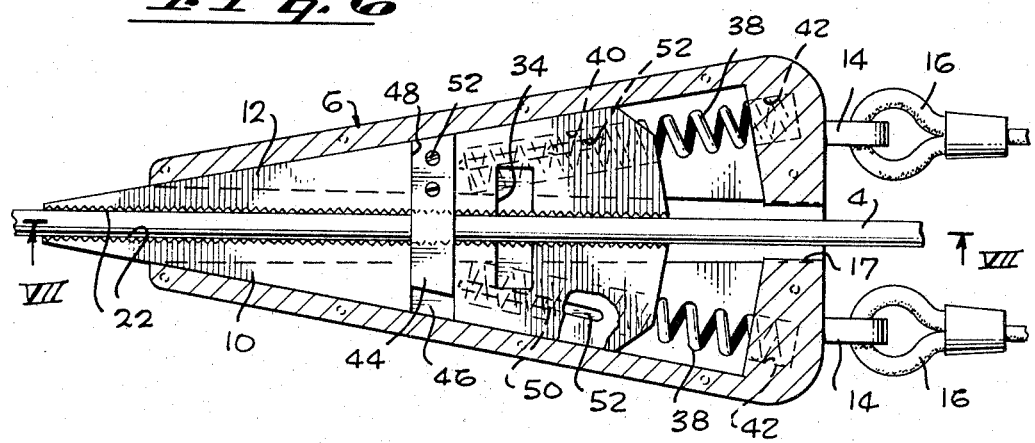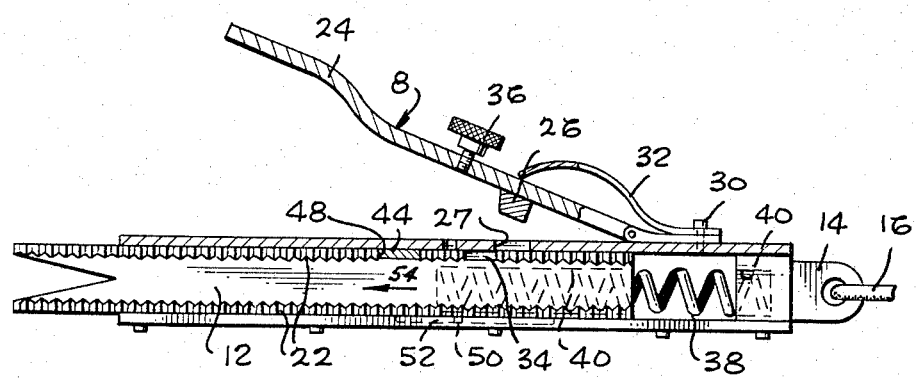

United States Patent Office 3,378,892
Patented Apr. 23, 1968

3,378,892
QUICK-ATTACH MECHANISM
Andrew E. Vano, Edwards, Calif., assignor to the United States of America as represented by the Administrator of the National Aeronautics and Space Administration
Filed July 25, 1966, Ser. No. 567,686
5 Claims. (Cl. 24—126)

The invention described herein was made by an employee of the United States Government and may be manufactured and used by or for the Government for governmental purposes without the payment of any royalties thereon or therefor.

This invention relates to clamps, of the slideable jaw type, that are used for securing wires, ropes, cables, or the like, and more particularly to an improved clamp that can be applied to the above items quickly and easily.

Clamps having slideable jaws are well known in the art. For example, the patent to Entwistle et al., U.S. Patent No. 1,720,037, discloses a clamp for gripping tape wherein a housing is provided with converging side walls that receive two slideable cam jaws. As the jaws slide along the converging side walls, the jaws are moved closer together so that they will grip an object between them. The above patent also shows the use of spring members to urge the jaws along the side walls into engagement with the tape.

Another patent showing this type of clamp is U.S. patent to Jamison et al., Patent Number 1,728,125. This patent also discloses a body having convergent side walls and wedge-shaped jaws slideable along said walls. Gravity moves the jaws into clamping engagement, and a pivoted yoke is connected to the jaws for raising the jaws so as to release them from gripping engagement.

While prior art clamps of the above type are quite efficient, there are some situations where prior art clamps are not presently suited for use. There are situations where it is desirable to apply a clamp quickly and easily, as for example on a moving cable. There are other occasions where it may be desirable to permit the cable to play out through the clamp until it is desired to clamp the cable, and then to quickly attach the clamp to the cable.

One reason prior art clamps are not suited for situations, as described above, is because the jaws get in the way when applying the clamp. It has generally been necessary to manually hold the jaws of the clamp apart, so the article to be gripped can be placed between the jaws of the clamp. It can be seen that the jaws, as well as the operator's hand, would get in the way and it would be awkward or dangerous to attempt to manually maintain the jaws apart and clamp a moving object such as a heavy cable.

An illustration of the need for a clamp that can be easily and quickly applied is in attaching a re-drop parachute to an aerial recovery package. The method of aerial recovery has been demonstarted as an efficient means of transferring cargo to a flying aircraft; the method has been used to recover a spacecraft (Observer satellites), rescue personnel (ground pick-ups), transfer cargo between flying aircraft and shows promise of many more varied applications.

During an aerial recovery operation, it is sometimes necessary to attach a re-drop parachute to the recovered cargo (package). This occurs if the package in tow is to be rigged with a larger parachute for a softer landing or if it begins oscillations that cause damage to itself or the recovery aircraft and thus prevent boarding.

In attaching a re-drop parachute, the recovery aircraft attaches the re-drop parachute to the tow cable with a clamping mechanism. The tow cable is then cut, releasing the package along with its new (re-drop) parachute.

It will be appreciated that the clamp that attaches the re-drop parachute to the cable must be easily operated, positioned, and applied since the above is a critical split-second operation, and any errors can result in a complete loss of the experiment or injury to the personnel. A clamp made, as taught by this invention, is well suited for situations such as described above.

A clamp made, as taught by this invention, as discussed hereafter, is capable of being applied to moving or stationary objects, as well as receiving an object, but not clamping it, until such time as clamping is desired.

The above is accomplished by providing a clamp with a trigger mechanism in the housing that maintains the jaws apart until clamping is desired. The trigger has a sear that engages a groove in each jaw to hold the jaws retracted. Additionally, resilient means, in the form of springs, are provided to urge the jaws into clamping engagement whenever the sear is removed by the trigger.

The clamp's jaws are also provided with a bridging arrangement to maintain them aligned when they move. The bridging arrangement guides the jaws so they will grip the object evenly, and also so both jaws will be engaged by the sear of the trigger mechanism when the jaws are retracted.

With the above construction, the clamp can be made to operate very quickly or to remain inoperative until such time as clamping is desired. With the jaws positioned retracted, the clamp can be held relative to a moving object such as a cable, and when the clamp is correctly positioned, or when it is desired to clamp the cable, the trigger is operated to release the jaws and the springs will immediately snap the jaws into engagement with the moving cable. Additionally, even though the object is not moving, it can be seen that it is much easier to apply the clamp without having to manually hold the jaws apart while trying to place the object between the jaws.

With the foregoing in mind, it is generally an object of this invention to provide a clamp that can be easily applied to a moving or stationary article.

It is another object of this invention to provide a quick acting clamp that can be easily applied to the article to be gripped without the jaws getting in the way.

It is another object of this invention to provide a clamp that can be held in a readiness condition so it can be applied whenever desired.

Other objects and advantages will appear from the following description considered in conjunction with the accompanying drawings wherein:

FIG. 1 is an overall view of the clamp showing the trigger;

FIG. 2 is a plan view of the clamp with various parts of the upper surface cut away to show the internal elements of the clamp when in retracted position;

FIG. 3 is a view of FIG. 2 taken in the direction of arrows III—III showing the jaws in the retracted position;

FIG. 4 is a sectional view of FIG. 2 taken in the direction of arrows IV—IV showing the trigger sear member; and FIG. 5 is a sectional view of FIG. 2 taken in the direction of arrows V—V showing the bridge arrangement for maintaining jaw alignment;

FIG. 6 is a view like FIG. 2 but showing the jaws in the clamping position;

FIG. 7 is a sectional view of FIG. 6 taken in the direction of arrows VII—VII showing the jaws in the clamping position;

FIG. 8 is an end view of the clamp of FIG. 1 viewed from the left hand end.

Referring to FIG. 1 of the drawings, there is shown an overall view of clamp 2 in clamping engagement with an elongated workpiece that may be a rope or cable 4, for example.

The clamp includes housing 6 that has a generally triangular configuration (although the outer shape of housing 6 is not material). A trigger 8 is pivotally mounted on the outer surface of the housing (the operation of the trigger will be described below) and the clamp also contains slideable wedge-shaped jaws 10, 12 carried in housing 6 to grip cable 4. The rear or back portion of housing 6 is provided with eye members 14, 14 to which cables 16, 16 may be attached that in turn may be connected to a re-drop chute (not shown) carried by a recovery plane, or to any object desired. The lower surface of housing 6, as more clearly shown in FIGS. 4, 5, and 8 contains a passage 17 for entry of the cable into the housing so it can be positioned between jaws 10 and 12.

Referring to FIG. 2, there is shown a plan view of the clamp with portions broken away to more clearly illustrate the inside of the clamp when the jaws are in retracted position.

Housing 6 has internal convergent side walls 18, 20. Carried within housing 6, in slideable engagement with converging side walls 18, 20, are wedge-shaped jaws 10 and 12. Referring to FIG. 3, each jaw may be provided with serrated teeth and spikes on its gripping surface 22 so as to penetrate the article to be clamped to resist slippage when the material, such as cable 4, is gripped between the jaws. Of course the specific configuration of the jaws will depend on the article gripped. The converging side walls will cam jaws 10 and 12 closer together, as the jaws move along the wall, so they will tightly grip cable 4. Additionally, this wedging action causes the jaws to grip cable 4 more tightly the harder the cable is pulled outwardly (to the left).

Referring to FIG. 3, trigger mechanism 8 operates to keep jaws 10 and 12 retracted. The trigger mechanism includes handle 24 that has a sear 26 of inverted U-shape (more clearly shown in FIG. 4) connected to the under surface of handle 24. Sear 26 moves through a passage 27 in housing 6 so it can contact the jaws. The handle is pivotally connected to a hinge member 28 that is fastened to the upper surface of housing 6 by means in the form of screws 30. Means, in the form of a leaf spring 32, is also fastened by screw 30 to the housing. Leaf spring 32 operates to hold handle 24 against the housing to keep sear 26 in engagement with a groove 34 provided in each jaw. When the jaws are moved inside the housing, leaf spring 32 moves handle 24 that in turn moves sear 26 into the groove 34 that is in each jaw, to hold each jaw in retracted position.

To prevent accidental dislodgement of handle 24, means in the form of a thumb screw 36 is threaded through handle 24 into housing 6. The handle cannot now be raised until thumb screw 26 has been removed, as shown in FIG. 7.

Each jaw 10, 12 is urged into gripping engagement (to the left) by resilient means in the form of a coil spring 38. Each jaw is provided with a recess 40 to receive one end of a spring 38, and housing 6 is provided with a complementary recess 42 to receive the other end of each spring 38. The springs function to snap the jaws outwardly from the housing into gripping engagement with cable 4.

Referring to FIGS. 2 and 5, jaws 10 and 12 are maintained in alignment, as they move in and out of housing 6, by means in the form of a bridge member 44. Jaw 10 is provided with a second groove 46 parallel to groove 34, and jaw 12 is provided with a similar groove 48. Bridge member 44 rides in both grooves 46, 48. One end of bridge member 44 is fastened into groove 48 by means in the form of screws 52. The other end of bridge member 44 is slidably received in groove 46 in the other jaw 10. The portion of bridge member 44 in groove 46 can slide relative to jaw 10 so the jaws can move sidewise relative to each other as they move in and out of the housing. The function of bridge member 44 is to maintain jaws 10 and 12 aligned as they move in or out of housing 6. This is to prevent one jaw from advancing ahead of, or twisting relative to the other jaw, or of being pulled out of the housing. This bridge member also functions to maintain grooves 34, 34 in the jaws aligned, so sear 26 can drop into these grooves when the jaws are retracted into the housing.

Jaws 10 and 12 are prevented from moving away from side walls 18 and 20 so they do not get in the way when an object to be gripped is inserted in passage 17. Each jaw contains a projection or pin 50 on its under surface that slides in a slot 52 contained in the lower portion of housing 6. Each slot 52 is parallel to its adjacent side wall. The function of this pin, and slot connection, is to prevent one jaw from sliding sideways toward the other jaw and blocking passage 17. It will be noted that bridge member 44 does not prevent sidewise movement of the jaws.

Referring now to FIGS. 6 and 7, and comparing them to FIGS. 2 and 3, the position of the jaws are now shown in the engaged or clamping position. Referring to FIGS. 6 and 7, lever 24 has been raised, and sear 26 moved out of groove 34, 34. Springs 38 have snapped the jaws forwardly in the direction of arrow 54, shown in FIG. 7, to cam the jaws into engagement with cable 14.

*Operation*

The mode of operation of this clamp will now be explained. To prepare the clamp for operation, all that is necessary is that jaws 10, 12 be pushed inwardly (to the right) into housing 6 to compress springs 38, 38. Leaf spring 32 will urge handle 24 downwardly to force sear 26 into recesses 34, 34 in the upper surfaces of the jaws. Bridge member 44 will keep grooves 34, 34 aligned so they will line up with the sear. When sear 26 engages in grooves 34, 34 it will hold the jaws retracted against the force of springs 38, 38 so the jaws are in position and are ready for release. As a safety precaution, thumb screw 36 (FIG. 3), may be threaded through lever 24 and into housing 6 to prevent the lever from being accidentally raised and releasing the jaws.

When an article, such as cable 14, is to be gripped, thumb screw 36 is first removed, then clamp 2 is snapped over the cable (which may be moving) and is positioned relative to the cable to accurately align the cable between jaws 10 and 12. Lever 24 is then lifted upwardly to pull sear 26 out of grooves 34, 34 so jaws 10, 12 will be snapped outwardly by springs 38, 38. As the jaws move outwardly, bridge member 44 maintains the jaws in alignment so that they both grip the cable evenly with no danger of the jaws being misaligned, or one jaw being completely pulled out of the housing. In addition, each jaw has a pin 50 sliding in a slot 52 in the housing that will also keep each jaw aligned. The clamp will now grip the cable, and connection is complete.

To remove the clamp, all that is necessary is to move jaws 10, 12 into housing 6 so they release the article, and to push the jaws back until sear 26 again drops into passages 34, 34 in the jaws to hold the jaws retracted.

From the foregoing it will be seen that the clamp is quite simple in construction, that the clamp can be applied to a moving object without danger of the jaws getting in the way while trying to clamp the object, and the jaws snap into engagement as soon as the trigger is operated. Additionally, once the jaws are retracted, the clamp is ready for immediate use, and also the jaws are maintained in alignment so they can be easily engaged by the sear so they will not twist, and so one jaw will not move ahead of the other jaw.

Although but a single embodiment of the present invention has been illustrated and described, it will be apparent to one skilled in the art that there are changes and modi-

What is claimed is:

1. In a clamp, the combination comprising:
a housing containing convergent side walls;
wedge-shaped jaws positioned in said housing in slideable engagement with said convergent side walls;
a handle pivotally mounted on said housing;
a sear carried by said handle;
said housing containing a passage to permit movement of said sear into the interior of said housing;
each jaw containing means to engage said sear when said jaws are retracted in said housing, said sear preventing said jaws from moving into gripping engagement; and
resilient means cooperating with said housing to urge each jaw into gripping engagement when said sear is removed from said jaws.

2. In a clamp, the combination comprising:
a housing containing convergent side walls;
wedge-shaped jaws positioned in said housing in slideable engagement with said convergent side walls;
a handle;
a sear carried by said handle;
said housing containing a passage to permit movement of said sear into and out of the interior of said housing;
each jaw containing means to engage said sear when said jaws are retracted in said housing, said sear preventing said jaws from moving into gripping engagement;
a coil spring for each jaw to urge each jaw out of said housing, each spring having one end engaging its jaw and the other end engaging said housing; and
a bridge member interconnecting said jaws to keep them aligned, said bridge member preventing one jaw from moving ahead of the other jaw.

3. A device, as set forth in claim 2, wherein:
said housing contains a slot parallel to, and adjacent to each side wall; and
a pin is carried by each jaw and is moveable in the slot adjacent its side wall, said pin and slot connection maintaining each of said jaws in engagement with its adjacent side wall.

4. A device, as set forth in claim 3, wherein:
a leaf spring is carried by said housing and engages said handle to urge said sear into said passage in said housing; and
means are provided to prevent accidental release of said jaws.

5. In a clamp, the combination comprising:
a housing containing convergent side walls;
wedge-shaped jaws positioned in said housing in slideable engagement with said convergent side walls;
a handle pivotally mounted on said housing;
a sear carried by said handle;
said housing containing a passage to permit movement of said sear into the interior of said housing;
a leaf spring carried by said housing and engaging said handle to urge said sear into said passage in said housing;
each jaw containing a passage to receive said sear when said jaws are retracted in said housing, said sear preventing said jaws from moving into gripping engagement;
a coil spring for each jaw to urge each jaw out of said housing, each spring having one end engaging its jaw and the other end engaging said housing;
a bridge member interconnecting said jaws to keep them aligned, said bridge member preventing one jaw from moving ahead of the other jaw;
a removeable thumb-screw to fasten said handle against said housing to prevent accidental release of said jaws;
said housing containing a slot parallel to, and adjacent each side wall; and
a pin is carried by each jaw and is moveable in said slot adjacent its side wall, said pin and slot connection maintaining each of said jaws in engagement with its adjacent side wall.

References Cited

UNITED STATES PATENTS

| | | |
|---|---|---|
| 331,088 | 11/1885 | Sackett. |
| 944,141 | 12/1909 | Mounts _____ 24—136 |
| 1,708,979 | 4/1929 | Usher _____ 24—126 |

FOREIGN PATENTS

| | | |
|---|---|---|
| 1,074,113 | 10/1954 | France. |
| 13,230 | 7/1916 | Great Britain. |

BERNARD A. GELAK, *Primary Examiner.*